(12) United States Patent  
Suzuki

(10) Patent No.: US 11,900,002 B1
(45) Date of Patent: Feb. 13, 2024

(54) COMMUNICATION APPARATUS, COMMUNICATION TARGET DETERMINATION METHOD IN COMMUNICATION APPARATUS, AND IMAGE FORMING DEVICE

(71) Applicant: TOSHIBA TEC KABUSHIKI KAISHA, Tokyo (JP)

(72) Inventor: Takaaki Suzuki, Tagata Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/898,440

(22) Filed: Aug. 29, 2022

(51) Int. Cl.
*G06F 3/12* (2006.01)
*G06F 13/38* (2006.01)
*G06F 3/0482* (2013.01)

(52) U.S. Cl.
CPC .......... *G06F 3/1293* (2013.01); *G06F 3/0482* (2013.01); *G06F 13/38* (2013.01)

(58) Field of Classification Search
CPC .................................................... G06F 3/1293
USPC ........................................................ 358/1.15
See application file for complete search history.

(56) References Cited

U.S. PATENT DOCUMENTS

| | | | |
|---|---|---|---|
| 2002/0147003 A1* | 10/2002 | Tada | H04W 76/10 |
| | | | 455/412.1 |
| 2017/0214735 A1* | 7/2017 | Sunata | H04L 67/60 |
| 2018/0241628 A1* | 8/2018 | Hosoda | H04W 76/15 |

* cited by examiner

*Primary Examiner* — Jacky X Zheng
(74) *Attorney, Agent, or Firm* — Kim & Stewart LLP

(57) ABSTRACT

A communication apparatus includes a communication interface configured to communicate with a plurality of communication devices on a network, a memory that stores setting data in which a plurality of different types of communication conditions are associated with each other, a display, and a processor configured to search the network for connectable communication devices, control the display to display a first screen indicating one or more of the communication devices that satisfy the communication conditions, and upon selection of a communication device through the first screen, determine the selected communication device as a communication target of the communication apparatus.

20 Claims, 8 Drawing Sheets

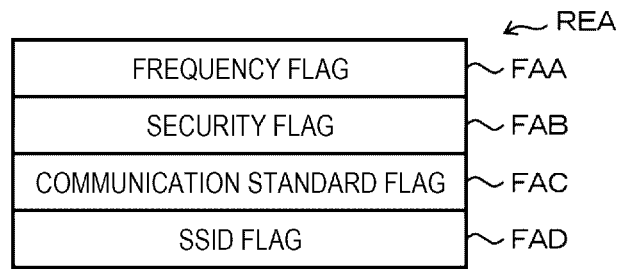
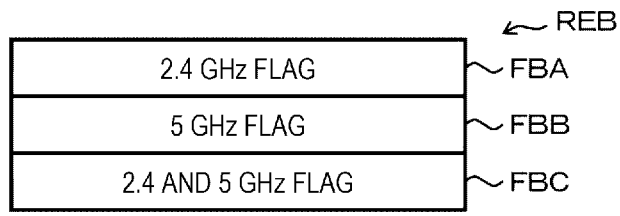
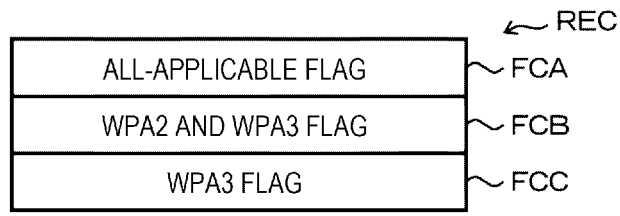

| AP001 | 2.4GHz | WPA2 | 802.11b |
| AP002 | 5GHz | WPA3 | 802.11a/n/ac |
| AP003 | 2.4GHz | WPA2/WPA3 | 802.11b/g/ac |
| AP007 | 5GHz | WPA3 | 802.11a/n/ac/ax |
| AP030 | 2.4GHz | WPA3 | 802.11b/g/n |
| SP004 | 5GHz | WPA2 | 802.11a/g/n |
| SP010 | 5GHz | WPA3 | 802.11a/b |
| SP020 | 5GHz | WPA3 | 802.11a/b/g |
| SP025 | 5GHz | WPA3 | 802.11b/g | ns
COMMUNICATION APPARATUS, COMMUNICATION TARGET DETERMINATION METHOD IN COMMUNICATION APPARATUS, AND IMAGE FORMING DEVICE

FIELD

Embodiments described herein relate to a communication apparatus, a method performed by a communication apparatus, and an image forming device.

BACKGROUND

Most image forming devices include a communication apparatus, and have a function of acquiring image data from another communication device by wireless communication.

Such an image forming device can be used in an office in which a wireless local area network (LAN) is installed with one or more communication devices provided as an access point in the office. In such a case, the image forming device may be able to communicate with a plurality of devices, some of which are access points and some of which are not access points.

When a plurality of communication devices are present as possible communication targets of the image forming device or its communication apparatus, an operator needs to select one of the communication devices as the communication target. However, when the number of candidate communication devices is large, the burden on the operator for selecting a communication device as the communication target increases.

Under such circumstances, it has been desired that an operator be able to more easily select a communication target from the candidate communication devices.

BRIEF DESCRIPTION OF THE DRAWINGS

FIGS. 2 through 6 depict data records included in setting data.

DETAILED DESCRIPTION

In general, according to one embodiment, a communication apparatus includes a communication interface configured to communicate with a plurality of communication devices on a network, a memory that stores setting data in which a plurality of different types of communication conditions are associated with each other, a display, and a processor. The processor is configured to search for one or more connectable communication devices on the network, control the display to display a first screen indicating one or more of the communication devices that satisfy the communication conditions, and upon selection of a communication device through the first screen, determine the selected communication device as a communication target of the communication apparatus.

Hereinafter, certain example embodiments will be described with reference to the drawings. In this disclosure, a multifunction peripheral including a communication apparatus that performs wireless communication will be described as one non-limiting example. The multifunction peripheral is a type of image forming device that has, as a primary function, those functions involving image formation such as a print function and a copy function, but may have other functions as well.

Figure 1:
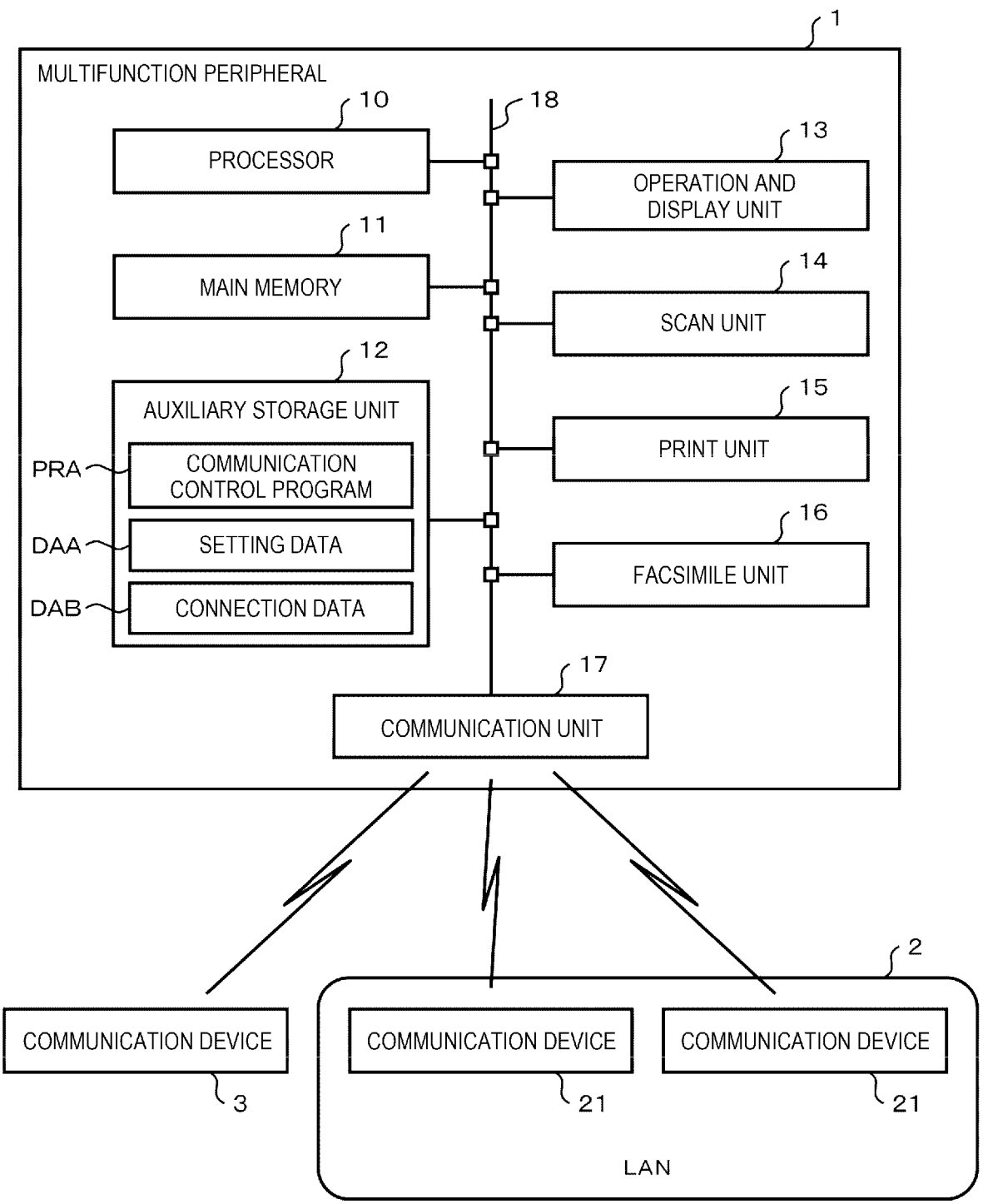
FIG. 1 is a hardware block diagram of a multifunction peripheral (MFP) according to an embodiment.

FIG. 1 is a hardware block diagram of a multifunction peripheral 1 according to an embodiment.

The multifunction peripheral 1 includes a processor 10, a main memory 11, an auxiliary storage unit 12, an operation and display unit 13, a scan unit 14, a print unit 15, a facsimile unit 16, a communication unit 17, a transmission path 18, and the like. The processor 10, the main memory 11, the auxiliary storage unit 12, the operation and display unit 13, the scan unit 14, the print unit 15, the facsimile unit 16, and the communication unit 17 are connected to one another via the transmission path 18.

The processor 10, the main memory 11, and the auxiliary storage unit 12 are connected by the transmission path 18 to perform information processing for controlling the multifunction peripheral 1.

The processor 10 is a processing unit such as a central processing unit (CPU) that executes, according to an information processing program such as an operating system and an application program, information processing for controlling the other components of the multifunction peripheral 1 to perform various functions thereof.

The main memory 11 includes a read-only memory area and a rewritable memory area. The read-only memory area of the main memory 11 stores an information processing program. The read-only memory area or the rewritable memory area of the main memory 11 may store data necessary for the processor 10 to execute processing for controlling the components of the multifunction peripheral 1. The rewritable memory area of the main memory 11 can be used as a work area for the processor 10.

The auxiliary storage unit 12 is, for example, an electric erasable programmable read-only memory (EEPROM), a hard disc drive (HDD), a solid-state drive (SSD), or another known storage device. The auxiliary storage unit 12 stores data used when the processor 10 performs various types of processing and data generated by the processing in the processor 10. The auxiliary storage unit 12 may store an information processing program. In one embodiment, the auxiliary storage unit 12 stores a communication control program PRA. A part of a storage area of the auxiliary storage unit 12 is used for storing setting data DAA and connection data DAB. The setting data DAA represents various settings related to a connection target setting to be described later. Details of the setting data DAA will be described later. The connection data DAB represents various types of information necessary for wireless communication with a communication device determined as a connection target. The various types of information represented by the connection data DAB includes, for example, a service set identifier (SSID) assigned to a communication device as a connection target, and a communication standard, a frequency band, and a security protocol that can be used in the communication device.

The operation and display unit 13 receives an operation by an operator and performs display various types of information for the operator. The operation and display unit 13 includes various operation devices or input devices and display devices such as a touch panel, a keyboard, a key switch, an LED lamp, and a liquid crystal display panel. The operator is a user of the multifunction peripheral 1 in many cases. However, an operator who performs maintenance of the multifunction peripheral 1 may be the operator as well.

The scan unit 14 is a scanner that reads a document and generates the image data of the document.

The print unit 15 prints an image indicated by image data on a sheet. The print unit 15 includes a known print device such as an electrophotographic image forming device. The print unit 15 corresponds to a forming unit that forms an image represented by image data on a sheet.

The facsimile unit 16 performs various types of known processing for performing image communication conforming to a facsimile standard via a communication network (not shown) such as a public switched telephone network (PSTN).

The communication unit 17 executes communication processing for wireless communication with another communication device in the vicinity. The communication unit 17 is, for example, a communication interface circuit that supports a plurality of communication modes in which communication conditions are different from each other. In one embodiment, the communication conditions include a frequency band, a security protocol, and a communication standard. For example, the communication unit 17 can use both frequency bands of a 2.4 GHz band and a 5 GHz band. Additionally, the communication unit 17 can use three types of security protocols including WPA, WPA2, and WPA3. Furthermore, the communication unit 17 conforms to the 802.11a standard, the 802.11b standard, the 802.11g standard, the 802.11n standard, the 802.11ac standard, and the 802.11ax standard of 802.11 series, which are specified by the Institute of Electric and Electronic Engineers (IEEE). The communication unit 17 can communicate in a plurality of communication modes in which combinations of the frequency bands, the security protocols, and the communication standards are different from each other.

The transmission path 18 includes an address bus, a data bus, a control signal line, and the like, and transmits data and a control signal transmitted and received between the connected components.

FIG. 2 depicts a data record REA included in the setting data DAA.

The data record REA stores information to be referred to for extracting communication devices as connection target candidates (hereinafter, referred to as candidate devices). The data record REA includes fields FAA, FAB, FAC, and FAD. The field FAA stores a flag (hereinafter, referred to as a frequency flag) indicating whether to refer to a frequency band. The field FAB stores a flag indicating whether to refer to a security protocol (hereinafter, referred to as a security flag). The field FAC stores a flag indicating whether to refer to a communication standard (hereinafter, referred to as a communication standard flag). The field FAD stores a flag indicating whether to refer to an SSID (hereinafter, referred to as an SSID flag). In one embodiment, the frequency flag, the security flag, the communication standard flag, and the SSID flag each indicate that the corresponding communication condition is to be referred to when those flags are in a valid state or set to "1."

Thus, since the setting data DAA includes the data record REA, it is possible to determine, based on the setting data DAA, a communication condition to be referred to among a plurality of communication conditions. That is, the auxiliary storage unit 12 stores such setting data DAA in a rewritable manner.

FIG. 3 depicts a data record REB included in the setting data DAA.

The data record REB defines an extraction condition for extracting candidate devices with respect to frequency bands. The data record REB includes fields FBA, FBB, and FBC. The field FBA stores a flag indicating whether support for the frequency band of the 2.4 GHz band is to be an extraction condition (hereinafter, referred to as a 2.4 GHz flag). The field FBB stores a flag indicating whether support for the frequency band of the 5 GHz band is to be an extraction condition (hereinafter, referred to as a 5 GHz flag). The field FBC stores a flag indicating whether support for both of frequency bands of the 2.4 GHz band and the 5 GHz band is to be an extraction condition (hereinafter, referred to as a 2.4 and 5 GHz flag). In one embodiment, the 2.4 GHz flag, the 5 GHz flag, and the 2.4 and 5 GHz flag each indicate that support for the corresponding frequency is to be an extraction condition when those flags are in a valid state or set to "1."

FIG. 4 depicts a data record REC included in the setting data DAA.

The data record REC defines an extraction condition for extracting candidate devices with respect to security protocols. The data record REC includes fields FCA, FCB, and FCC. The field FCA stores a flag indicating whether support for WPA, WPA2, WPA3, and all other security protocols is to be an extraction condition (hereinafter, referred to as an all-applicable flag). The field FCB stores a flag indicating whether support for both the security protocols of WPA2 and WPA3 is to be an extraction condition (hereinafter, referred to as a WPA2 and WPA3 flag). The field FCC stores a flag indicating whether support for the security protocol of WPA3 is to be an extraction condition (hereinafter, referred to as a WPA3 flag).

Figure 5:
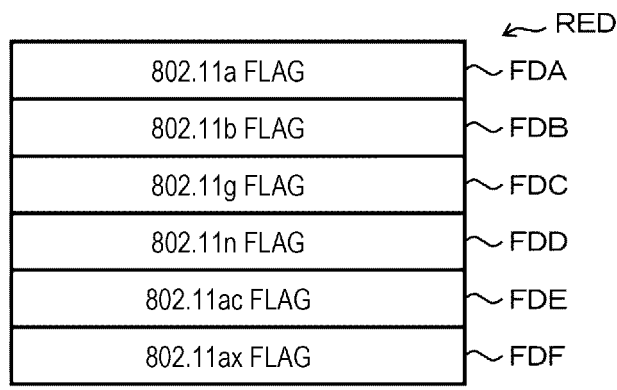

FIG. 5 depicts a data record RED included in the setting data DAA.

The data record RED defines an extraction condition for extracting candidate devices with respect to communication standards. The data record RED includes fields FDA, FDB, FDC, FDD, FDE, and FDF. The field FDA stores a flag indicating whether support for the 802.11a standard is to be an extraction condition (hereinafter, referred to as an 802.11a flag). The field FDB stores a flag indicating whether support for the 802.11b standard is to be an extraction condition (hereinafter, referred to as an 802.11b flag). The field FDC stores a flag indicating whether support for the 802.11g standard is to be an extraction condition (hereinafter, referred to as an 802.11g flag). The field FDD stores a flag indicating whether support for the 802.11n standard is to be an extraction condition (hereinafter, referred to as an 802.11n flag). The field FDE stores a flag indicating whether support for the 802.11ac standard is to be an extraction condition (hereinafter, referred to as an 802.11ac flag). The field FDF stores a flag indicating whether support for the 802.11ax standard is to be an extraction condition (hereinafter, referred to as an 802.11ax flag). In one embodiment, the 802.11a flag, the 802.11b flag, the 802.11g flag, the 802.11n flag, the 802.11ac flag, and the 802.11ax flag all indicate that support for the corresponding communication standard is to be an extraction condition when those flags are in a valid state or set to "1."

Figure 6:
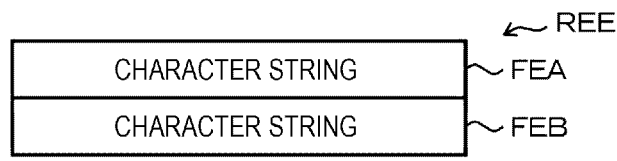

FIG. 6 depicts a data record REE included in the setting data DAA.

The data record REE defines an extraction condition for extracting candidate devices with respect to SSIDs. In the example of FIG. 6, the data record REE includes fields FEA and FEB each representing a character string to be included in SSIDs of communication devices to be extracted as candidate devices. The data record REE may include only the field FEA, or may include fields other than the fields FEA and FEB and may represent different character strings. If no character strings to be included in SSIDs of communication devices to be extracted as candidate devices are specified, the data record REE may include no fields, or the data record REE may not be included in the setting data DAA.

Next, an operation of the multifunction peripheral 1 configured as described above will be described. The processing described below is merely an example, and it is possible to change the order of the processing, omit a part of the processing, or add another processing as appropriate.

In the multifunction peripheral 1, the processor 10 controls the units of the multifunction device 1 so as to perform a print function, a copy function, a scan function, a facsimile function, and the like in the same manner as those performed by an existing MFP of the same type. For example, the multifunction peripheral 1 receives image data to be printed by the print function through communication between the communication unit 17 and a communication device determined as a connection target in advance. Then, the multifunction peripheral 1 prints an image represented by the image data by the print unit 15. Such a known operation may be performed, for example, by the processor 10 executing the same information processing as that performed by an existing MFP of the same type, and a detailed description thereof will be omitted. Hereinafter, an operation related to setting of a communication device as a connection target of the communication unit 17 will be described.

When the multifunction peripheral 1 is to be operated while using communication by the communication unit 17, it is necessary to set in advance a communication device as a connection target of the communication unit 17. Therefore, when installing or maintaining the multifunction peripheral 1, processing for setting a required communication device as a connection target is performed.

In the following description, it is assumed that the multifunction peripheral 1 is installed and used in an office provided with a LAN 2 including a plurality of communication devices 21, each functioning as an access point for wireless LAN communication. In such a case, in addition to the communication devices 21, for example, a smartphone, a tablet terminal, a personal computer, or various communication devices 3 having other communication functions may exist around the multifunction peripheral 1. In FIG. 1, only two communication devices 21 and one communication device 3 are shown, but more communication devices 21 and more communication devices 3 may exist.

An operator who performs setting instructs the start of setting related to communication in the communication unit 17 by, for example, a predetermined operation on the operation and display unit 13. In response to such an instruction received by, for example, the operation and display unit 13, the processor 10 executes, according to the communication control program PRA, information processing for changing various settings related to the communication in the communication unit 17 (hereinafter, referred to as setting processing).

Figure 7:
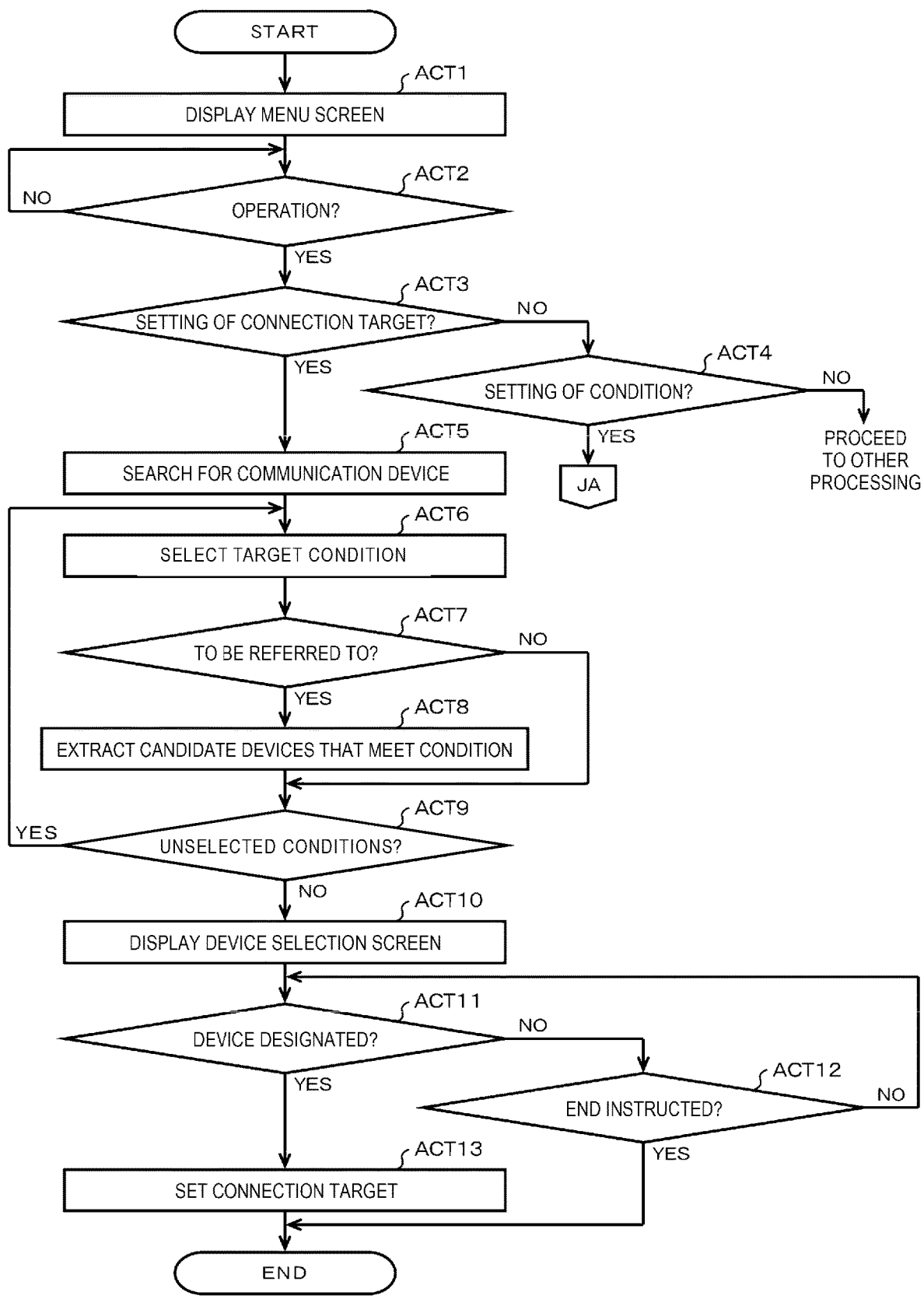
FIGS. 7 and 8 are flowcharts of setting processing.
Figure 8:
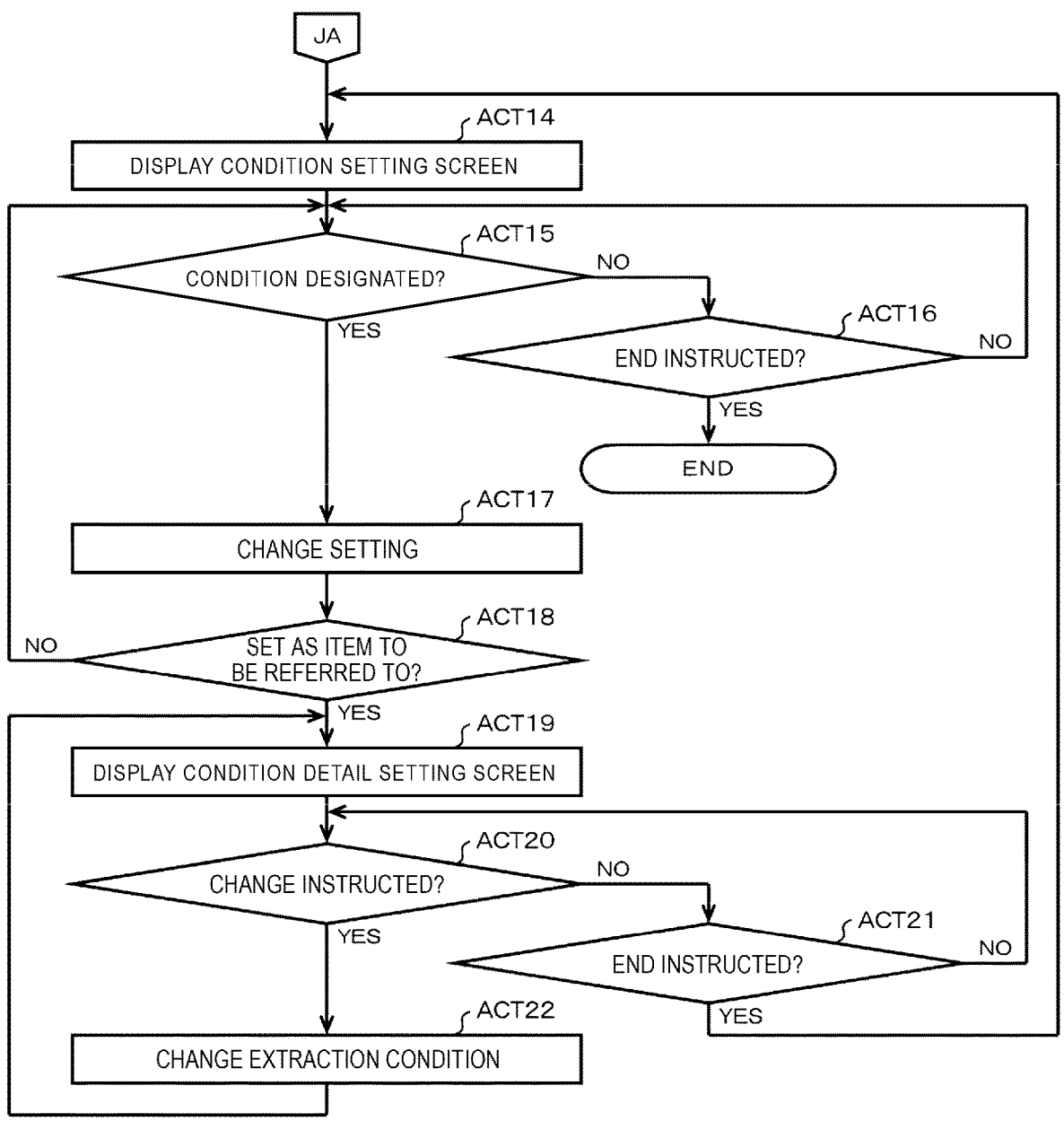

FIGS. 7 and 8 are flowcharts of the setting processing.

In ACT 1 of FIG. 7, the processor 10 causes the operation and display unit 13 to display a menu screen. The menu screen is a screen for allowing the operator to select one of a plurality of settings related to the communication in the communication unit 17. For example, the processor 10 instructs the operation and display unit 13 to display a menu screen represented by screen data stored in the auxiliary storage unit 12 in advance.

In ACT 2, the processor 10 waits for an operation related to the menu screen to be performed. Then, when an operation for instructing execution of any one of the plurality of settings related to the communication in the communication unit 17 is performed by the operator, for example, on the operation and display unit 13, the processor 10 determines YES in ACT 2 and proceeds to ACT 3.

In ACT 3, the processor 10 checks whether setting of a connection target is designated by the above operation. If the corresponding event cannot be confirmed, the processor 10 determines NO and proceeds to ACT 4.

In ACT 4, the processor 10 checks whether setting of an extraction condition of the connection target is designated by the above operation. Then, if the corresponding event cannot be confirmed, the processor 10 determines "NO", determines which other kind of setting is designated, and proceeds to processing for the corresponding setting. A description of this processing will be omitted.

If it is confirmed that the setting of the connection target is designated by the above operation, the processor 10 determines YES in ACT 3 and proceeds to ACT 5.

In ACT 5, the processor 10 searches for the communication devices 3 and 21 capable of communicating with the communication unit 17. For example, the processor 10 causes the communication unit 17 to sequentially communicate with the communicable communication devices 3 and 21, and collects information on communication conditions related to the respective communication devices 3 and 21. For example, SSIDs of the communication devices 3 and 21, and frequency bands, security protocols, and communication standards that can be used by the communication devices 3 and 21 are collected by receiving signals (e.g., beacons) transmitted by those communication devices 3 and 21. Here, the processor 10 generates list data representing a list of the found communication devices 3 and 21.

Figures 9, 10:
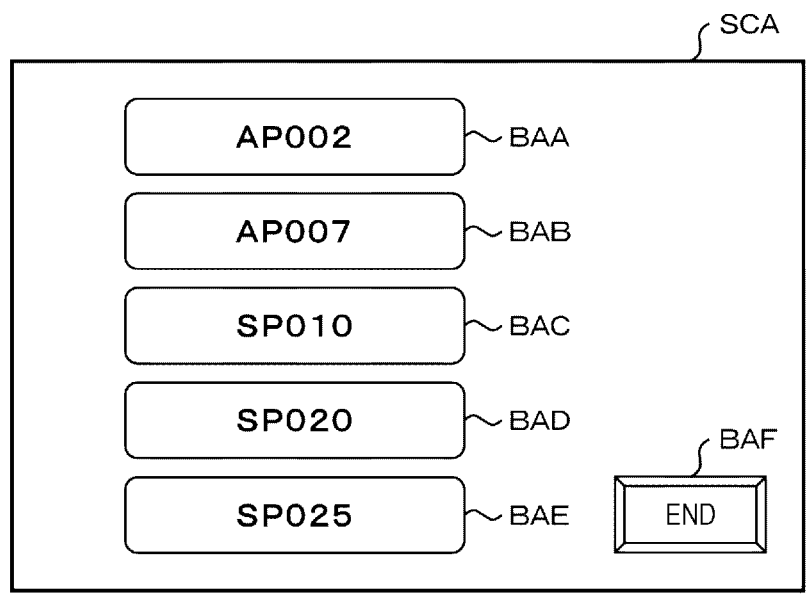
FIG. 9 depicts a table for storing list data.
FIG. 10 shows an example of a device selection screen.

FIG. 9 depicts an example of the list data. The list data is a set of records including the SSIDs, the frequency bands, the security protocols, and the communication standards collected for the found communication devices 3 and 21. FIG. 9 is an example when nine communication devices 3 and 21 are found. Actually, it is common that more communication devices 3 and 21 are found.

In ACT 6, the processor 10 selects one condition to be checked (hereinafter, referred to as a target condition) from a plurality of communication conditions.

In ACT 7, the processor 10 checks whether the target condition is to be referred to for extraction of candidate devices. For example, the processor 10 checks whether a flag related to the target condition indicates valid in the data record REA included in the setting data DAA. For example, if the target condition is the frequency band, the processor 10 checks whether the frequency flag set in the field FAA of the data record REA indicates valid. Then, if it is confirmed that the corresponding flag indicates valid, the processor 10 determines YES, that is, the target condition is to be referred to, and proceeds to ACT 8.

In ACT 8, the processor 10 focuses on the target condition and extracts candidate devices from the communication devices 3 and 21 found by the search in ACT 5. For example, when the frequency band is set as the target condition, the processor 10 extracts candidate devices according to the extraction condition defined by the data record REB included in the setting data DAA. For example, if the 2.4 GHz flag set in the field FBA indicates valid, the processor 10 extracts, as candidate devices, all the devices supporting the communication in the 2.4 GHz band among the communication devices 3 and 21 found by the search in ACT 5. After this, the processor 10 proceeds to ACT 9.

If the flag related to the target condition indicates invalid in the data record REA, in ACT 7, the processor 10 determines NO, that is, the target condition is not to be referred to for the extraction of candidate devices, and passes ACT 8 and proceeds to ACT 9.

In ACT 9, the processor 10 checks whether any conditions are not selected as the target conditions among the conditions included in the data record REA. If any condition is unselected, the processor 10 determines YES and returns to ACT 6, and repeats ACT 6 and the subsequent processing in the same manner as described above. In ACT 6, the processor 10 newly selects, as the target condition, a condition that has not been selected during the repetition of ACT 6 to ACT 9. When the processor 10 performs ACT 8 for the second time or later, the processor 10 extracts, according to an extraction condition related to the new target condition, candidate devices from the communication devices 3 and 21 that are extracted as the candidate devices during the repetition of ACT 6 to ACT 9.

If the processor 10 proceeds to ACT 9 when extraction of target conditions of all the conditions included in the data record REA is completed, the processor 10 determines NO because all the conditions have been selected, and proceeds to ACT 10. Thus, the processor 10 extracts, as candidate devices, devices that match all of the extraction conditions to be referred to among the conditions included in the data record REA.

In ACT 10, the processor 10 causes the operation and display unit 13 to display a device selection screen. The device selection screen is a user interface screen for allowing an operator to select a communication device as a connection target from among candidate devices.

FIG. 10 shows an example of a device selection screen SCA.

The device selection screen SCA is an example when (1) the list data shown in FIG. 9 is generated by the search in ACT 5, when (2) frequency bands and security protocols are to be referred to, when (3) support for 5 GHz is set as an extraction condition regarding frequency bands, and when (4) support for WPA3 is set as an extraction condition regarding security protocols. Therefore, when the processor 10 proceeds to ACT 19 in FIG. 8, the processor 10 extracts, as candidate devices, five communication devices 3 and 21 whose SSIDs are "AP002", "AP007", "SP010", "SP020", and "SP025".

The processor 10 generates the device selection screen SCA including buttons BAA, BAB, BAC, BAD, and BAE associates with the respective candidate devices and representing SSIDs of the candidate devices by character strings, and a button BAF at a predetermined position as illustrated in FIG. 10. The buttons BAA to BAE are software keys for an operator to designate the associated candidate devices as connection targets. The button BAF is a soft key for an operator to designate the end of connection target setting. Thus, the device selection screen SCA is a screen for displaying a list of candidate devices by the arrangement of the buttons BAA to BAE and for receiving designation of a connection target.

In ACT 11, the processor 10 checks whether a device is designated as a connection target. If the corresponding event cannot be confirmed, the processor 10 determines NO and proceeds to ACT 12. In ACT 12, the processor 10 checks whether the end is instructed. If the corresponding event cannot be confirmed, the processor 10 determines NO and returns to ACT 11. Thus, in ACT 11 and ACT 12, the processor 10 waits for a device to be designated or an end instruction.

If an operator determines one of the candidate devices to be set as a connection target, the operator designates the candidate device to be set as a connection target by a predetermined operation such as tapping a button associated with the candidate device. In response to such designation being received by, for example, the operation and display unit 13, the processor 10 determines YES in ACT 11 and proceeds to ACT 13.

In ACT 13, the processor 10 sets a connection target. For example, the processor 10 communicates with a communication device designated as a connection target by an operator, performs a predetermined connection procedure, generates connection data DAB including various types of information necessary for reconnection with the communication device, and stores the connection data DAB in the auxiliary storage unit 12. After this, the processor 10 ends the setting processing.

If an operator determines to end the setting processing of a device to be a connection target without designating the device to be the connection target, the operator instructs the end by a predetermined operation such as tapping the button BAF. In response to such an instruction received by, for example, the operation and display unit 13, the processor 10 determines YES in ACT 12 and ends the setting without executing ACT 13.

When the setting processing is ended, the processor 10 may start the setting again, or may return to ACT 1 instead of ending the setting processing and repeat ACT 1 and the subsequent processing.

When an operator wants to change various settings for extracting candidate devices as described above, the operator instructs setting of conditions by, for example, a predetermined operation on the operation and display unit 13 when the menu screen is displayed. In response to such designation being received by, for example, the operation and display unit 13, the processor 10 determines YES in ACT 4 and proceeds to ACT 14 in FIG. 8.

In ACT 14, the processor 10 causes the operation and display unit 13 to display a condition setting screen. The condition setting screen is a user interface screen for setting communication conditions to be referred to in order to extract candidate devices.

Figure 11:
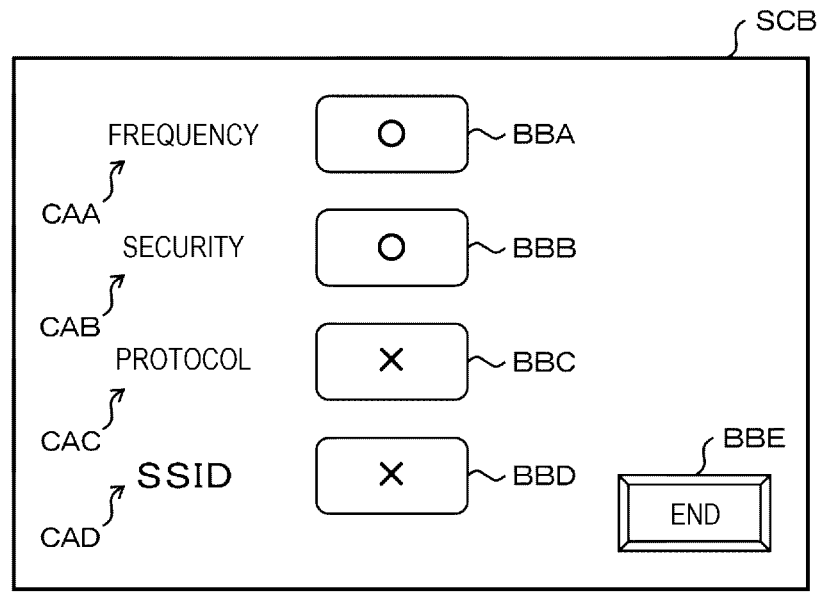
FIG. 11 shows an example of a condition setting screen.

FIG. 11 shows an example of the condition setting screen SCB in which, in the data record REA included in the setting data DAA, the frequency flag and the security flag set in the fields FAA and FAB indicate valid, and the communication standard flag and the SSID flag set in the fields FAC and FAD indicate invalid.

On a base image predetermined to arrange character strings CAA, CAB, CAC, and CAD for distinguishing conditions, buttons BBA, BBB, BBC, and BBD associated with the respective conditions, and a button BBE on the condition setting screen SCB as illustrated, the processor 10 generates the condition setting screen SCB to superimpose "○" and "x" indicating whether the condition on each of the buttons is to be referred to. Since the frequency flag and the security flag indicate valid, the condition setting screen SCB indicates "○" superimposed on the buttons BBA and BBB associated with the frequency band and the security protocol. Since the communication standard flag and the SSID flag indicate invalid, the condition setting screen SCB indicates "x" superimposed on the buttons BBC and BBD associated with the communication standard and the SSID.

The buttons BBA to BBD are software keys for an operator to designate whether the respective associated conditions are to be referred to. The button BBE is a software key for an operator to designate the end of the setting processing. Thus, the condition setting screen SCB is a screen for displaying "○" or "×" on the buttons BBA to BBD to indicate a current setting state as to whether the conditions are to be referred to and for receiving designation of the setting changes.

In ACT 15, the processor 10 checks whether any condition is designated. If the corresponding event cannot be confirmed, the processor 10 determines NO and proceeds to ACT 16. In ACT 16, the processor 10 checks whether the end is instructed. If the corresponding event cannot be confirmed, the processor 10 determines NO and returns to ACT 15. Thus, in ACT 15 and ACT 16, the processor 10 waits for a condition to be designated or an end instruction.

If an operator wants to change whether a condition is to be referred to, the operator designates the condition to be changed by a predetermined operation such as tapping a button associated with the condition. In response to such designation being received by, for example, the operation and display unit 13, the processor 10 determines YES in ACT 15 and proceeds to ACT 17.

In ACT 17, the processor 10 changes whether to refer to the designated condition. For example, the processor 10 changes a state of a flag related to the designated condition. For example, when the button BBA on the condition setting screen SCB is tapped, the processor 10 changes a state of the frequency flag set in the field FAA of the data record REA to a state indicating invalid.

In ACT 18, the processor 10 checks whether a designated condition is to be referred to. If it is confirmed that the designated condition is not to be referred to in ACT 17, the processor 10 determines NO in ACT 18 and returns to the waiting state in ACT 15 and ACT 16. However, if it is confirmed that the designated condition is to be referred to in ACT 17, the processor 10 determines YES in ACT 18 and proceeds to ACT 19.

In ACT 19, the processor 10 causes the operation and display unit 13 to display a condition detail setting screen. The condition detail setting screen is a user interface screen for changing an extraction condition to be referred to in ACT 17.

Figure 12:
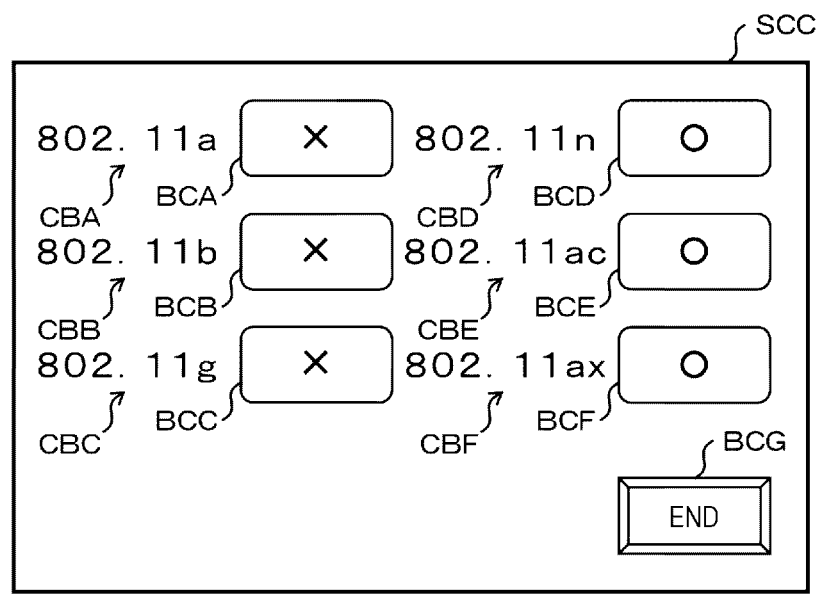
FIG. 12 shows an example of a condition detail setting screen.

FIG. 12 depicts an example of a condition detail setting screen SCC. The condition detail setting screen SCC is an example of a screen for changing an extraction condition related to communication standards. The condition detail setting screen SCC of FIG. 12 shows an example in which, in the data record RED included in the setting data DAA, the 802.11a flag, the 802.11b flag, and the 802.11g flag set in the fields FDA, FDB, and FDC indicate invalid, and the 802.11n flag, the 802.11ac flag, and the 802.11ax flag set in the fields FDD, FDE, and FDF indicate valid.

On a base image predetermined to arrange character strings CBA, CBB, CBC, CBD, CBE, and CBF for distinguishing the communication standards, buttons BCA, BCB, BCC, BCD, BCE, and BCF associated with the respective communication standards, and a button BCG on the condition detail setting screen SCC as illustrated, the processor 10 superimposes "○" and "×" indicating whether support for the communication standard is to be an extraction condition on each of the buttons to generate the condition detail setting screen SCC. Since the 802.11n flag, the 802.11ac flag, and the 802.11ax flag indicate "valid", the condition detail setting screen SCC indicates "○" superimposed on the buttons BCD, BCE, and BCF associated with the 802.11n standard, the 802.11ac standard, and the 802.11ax standard. Since the 802.11a flag, the 802.11b flag, and the 802.11g flag indicate invalid, the condition detail setting screen SCC indicates superimposed on the buttons BCA, BCB, and BCC associated with the 802.11a standard, the 802.11b standard, and the 802.11g standard.

The buttons BCA to BCF are software keys for an operator to designate to change whether support for the associated communication standards is to be an extraction condition. The button BCG is a software key for an operator to designate the end of the setting. Thus, the condition detail setting screen SCC is a screen for displaying a current setting state of the extraction condition by displaying "○" or "×" on the buttons BCA to BCF and for receiving designation of the setting changes.

In ACT 20, the processor 10 checks whether the change of the extraction condition is instructed. If the corresponding event cannot be confirmed, the processor 10 determines NO and proceeds to ACT 21. In ACT 21, the processor 10 checks whether the end is instructed. If the corresponding event cannot be confirmed, the processor 10 determines NO and returns to ACT 20. Thus, in ACT 20 and ACT 21, the processor 10 waits for a change instruction or an end instruction.

If an operator wants to change the extraction condition, the operator instructs to change the extraction condition by a predetermined operation such as tapping a button displayed on the condition setting screen. In response to such an instruction received by, for example, the operation and display unit 13, the processor 10 determines YES in ACT 20 and proceeds to ACT 22.

In ACT 22, the processor 10 changes the extraction condition in response to the instruction. For example, when the button BCC on the condition detail setting screen SCC is tapped, the processor 10 changes a state of the 802.11g flag set in the field FDC of the data record RED to a state indicating valid.

For example, when an operation instructing that support for 2.4 GHz is to be an extraction condition is performed on a condition setting screen related to the frequency band when the 5 GHz flag set in the field FBB of the data record REB is in a state indicating valid, the processor 10 changes a state of the 2.4 GHz flag set in the field FBA of the data record REB to a state indicating valid and further changes the state of the 5 GHz flag to a state indicating invalid.

For example, when an operation instructing that support for both the security protocols WPA2 and WPA3 is to be an extraction condition is performed on a condition setting screen related to the security protocol when the WPA3 flag set in the field FCC of the data record REC is in a state indicating valid, the processor 10 changes a state of the WPA2 and WPA3 flag set in the field FCB of the data record REC to a state indicating valid, and further changes the state of the WPA3 flag to a state indicating invalid.

For example, when an operation is performed to newly designate a character string to be included in SSIDs of communication devices to be extracted as candidate devices, the processor 10 adds a new field to the data record REE and sets data representing the designated character string in the field. For example, when an operation is performed to designate deletion of a character string that is to be included in SSIDs of communication devices to be extracted as candidate devices, the processor 10 deletes, from the data record REE, a field that is included in the data record REE and set with data of the corresponding character string. For example, when an operation is performed to designate a change of a character string that is to be included in SSIDs of communication devices to be extracted as candidate devices, the processor 10 updates data that is included in the data record REE and represents the character string in response to the instruction.

When the processor 10 finishes changing the extraction condition, the processor 10 returns to ACT 19, and repeats ACT 19 and the subsequent processing in the same manner as described above.

In the waiting state of ACT 15 and ACT 16, the processor 10 may wait for an instruction to change any extraction condition, and may proceed to ACT 19 in response to the instruction.

To end the change of the extraction condition, the operator instructs the end by a predetermined operation such as tapping the button BCG displayed on the condition detail setting screen SCC. In response to such an instruction received by, for example, the operation and display unit 13, the processor 10 determines YES in ACT 21, returns to ACT 14, and repeats ACT 14 and the subsequent processing in the same manner as described above.

When the change of whether to refer to a condition is completed, in a state where a condition setting screen is displayed, the operator instructs the end by a predetermined operation such as tapping the button BBE displayed on the condition setting screen SCB. In response to such an instruction being received by, for example, the operation and display unit 13, the processor 10 determines YES in ACT 16 and ends the setting processing. When the setting processing is ended, the processor 10 may start the setting processing again, or may return to ACT 1 instead of ending the setting processing and repeat ACT 1 and the subsequent processing.

As described above, the setting data DAA is updated in response to the instructions of the operator, and conditions for extracting candidate devices are changed.

Figure 13:
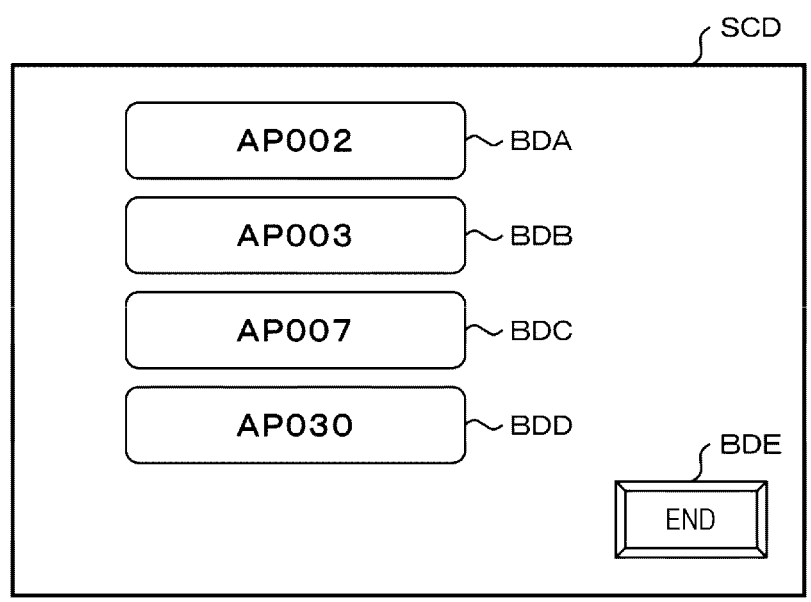
FIG. 13 shows an example of a device selection screen.

FIG. 13 depicts an example of a device selection screen SCD. Similar to the device selection screen SCA, the device selection screen SCD is an example when the list data shown in FIG. 9 is generated by the search in ACT 5. The device selection screen SCD is an example when (1) communication standards and SSIDs are to be referred to, when (2) support for the 802.11n standard, the 802.11ac standard, or the 802.11ax standard regarding the communication standards is set as an extraction condition, and when (3) the SSID including "AP" or "BBB" is set as an extraction condition. Therefore, when the processor 10 proceeds to ACT 19 in FIG. 8, the processor 10 extracts, as candidate devices, four communication devices 3 and 21 whose SSIDs are "AP002", "AP003", "AP007", and "AP030".

The processor 10 generates the device selection screen SCD including buttons BDA, BDB, BDC, and BDD representing the SSIDs of the candidate devices by character strings and a button BDE at a predetermined position as illustrated in FIG. 13.

The buttons BDA to BDD are software keys for an operator to designate the associated candidate devices as connection targets. The button BDE is a software key for an operator to designate the end of connection target setting. Thus, the device selection screen SCD is a screen for displaying a list of candidate devices different from those on the device selection screen SCA by the arrangement of the buttons BDA to BDD and for receiving designation of connection targets.

As described above, when setting a communication device to be a connection target of the communication unit 17, the multifunction peripheral 1 presents, as candidate devices, communication devices that are extracted from the communicable communication devices 3 and 21 found by the search. The communication devices are extracted according to extraction conditions that are valid in the data record REA of the setting data DAA stored in the auxiliary storage unit 12 in a rewritable manner. Thus, by rewriting the setting data DAA, it is possible to present different candidate devices as desired by an operator, such as the device selection screen SCA and the device selection screen SCD. Communication devices that are candidates for a communication target can be limited to a part of all communicable communication devices, and the operator can easily select a communication device to be a communication target.

In the multifunction peripheral 1, the processor 10 sets a communication condition to be validated in response to an instruction from an operator, and rewrites the setting data DAA. Thus, conditions for extracting candidate devices can be appropriately and easily changed in the multifunction peripheral 1 according to the desire of the operator.

In the multifunction peripheral 1, the processor 10 updates the setting data DAA to change extraction conditions in response to an instruction from the operator. Thus, extraction conditions can be appropriately and easily changed on the multifunction peripheral 1 according to the desire of the operator.

The above-described embodiments can be modified in various ways as follows.

As long as having a communication function of enabling communication in any of a plurality of communication modes in which combinations of communication conditions are different from each other, any device of a type different from the multifunction peripheral 1 can perform the same operation as described above. Any device of a type different from the multifunction peripheral 1 refers to, for example, a communication apparatus used for communication for other devices, or an image forming device having an image forming function as a main function.

Wireless communication may be performed according to any communication standard other than the 802.11 standards.

Some or all of the functions implemented by the processor 10 by information processing can also be implemented by dedicated hardware or the like that executes information processing without execution of a software program, such as one or more logic circuits. The functions described above can also be implemented by combining software control with hardware such as the logic circuits described above.

While certain embodiments have been described, these embodiments have been presented by way of example only, and are not intended to limit the scope of invention. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. A communication apparatus, comprising:
   a communication interface configured to communicate with a plurality of access points on a network;
   a memory that stores setting data in which a plurality of different types of communication conditions are associated with each other, wherein the communication conditions are used for the communication apparatus to connect to the access points via the communication interface;

a display; and a processor configured to:
- control the display to display a first screen through which each of the communication conditions can be enabled or disabled,
- search for one or more access points connectable via the communication interface on the network,
- control the display to display a second screen indicating one or more of the connectable access points that satisfy the enabled communication conditions and through which one of said one or more of the connectable access points is selectable, and
- in response to a selection of one of said one or more of the connectable access points through the second screen, determine to connect to the selected access point.

2. The communication apparatus according to claim 1, wherein each of the communication conditions is associated with a flag indicating whether the respective communication condition is enabled.

3. The communication apparatus according to claim 2, wherein the processor is further configured to:
- update the flag according to an input through the first screen.

4. The communication apparatus according to claim 3, wherein the communication conditions include at least one of a communication standard, a frequency band, a security protocol, and an identifier for wireless communications.

5. The communication apparatus according to claim 1, wherein
- the display includes a touch panel, and
- the second screen shows a list of selectable buttons corresponding to the one or more of the connectable access points.

6. The communication apparatus according to claim 5, wherein
- the selectable buttons show network identifiers corresponding to the connectable access points.

7. The communication apparatus according to claim 6, wherein one of the communication conditions indicates a character string included in the network identifiers.

8. The communication apparatus according to claim 1, wherein the processor is further configured to, based on a result of the search, generate connection data indicating one or more connectable access points in association with communication conditions supported thereby.

9. The communication apparatus according to claim 8, wherein the processor is further configured to compare the setting data with the connection data to generate the second screen.

10. The communication apparatus according to claim 1, wherein the communication apparatus is an image forming device.

11. A method performed by a communication apparatus, the method comprising:
- storing setting data in which a plurality of different types of communication conditions are associated with each other, wherein the communication conditions are used for the communication apparatus to connect to access points on a network;
- displaying a first screen through which each of the communication conditions can be enabled or disabled;
- searching for one or more access points connectable on the network;
- displaying a second screen indicating one or more of the connectable access points that satisfy the enabled communication conditions and through which one of said one or more of the connectable access points is selectable; and
- in response to a selection of one of said one or more of the connectable access points through the second screen, determining to connect to the selected access point.

12. The method according to claim 11, wherein each of the communication conditions is associated with a flag indicating whether the respective communication condition is enabled.

13. The method according to claim 12, further comprising:
- updating the flag according to an input through the first screen.

14. The method according to claim 13, wherein the communication conditions include at least one of a communication standard, a frequency band, a security protocol, and an identifier for wireless communications.

15. The method according to claim 11, wherein the second screen shows a list of selectable buttons corresponding to the one or more of the connectable access points.

16. The method according to claim 15, wherein
- the selectable buttons show network identifiers corresponding to the access points.

17. The method according to claim 16, wherein one of the communication conditions indicates a character string included in the network identifiers.

18. The method according to claim 11, further comprising:
- based on a result of the search, generating connection data indicating one or more connectable access points in association with communication conditions supported thereby.

19. The method according to claim 18, further comprising:
- comparing the setting data with the connection data to generate the second screen.

20. An image forming device, comprising:
- a printing unit;
- a communication interface configured to communicate with a plurality of access points on a network;
- a memory that stores setting data in which a plurality of different types of communication conditions are associated with each other, wherein the communication conditions are used for the communication apparatus to connect to the access points via the communication interface;
- a display; and
- a processor configured to:
  - control the display to display a first screen through which each of the communication conditions can be enabled or disabled,
  - search for one or more access points connectable via the communication interface on the network,
  - control the display to display a second screen indicating one or more of the connectable access points that satisfy the enabled communication conditions and through which one of said one or more of the connectable access points is selectable,
  - in response to a selection of one of said one or more of the connectable access points through the second screen, determine to connect to the selected access point, and
  - control the printing unit to form an image on a sheet in response to image data received via the selected access point.

* * * * *